United States Patent
Shoji (10) Patent No.: US 10,180,646 B2
(45) Date of Patent: Jan. 15, 2019

(54) IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Atsushi Shoji, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/896,623

(22) Filed: Feb. 14, 2018

(65) Prior Publication Data

US 2018/0239284 A1 Aug. 23, 2018

(30) Foreign Application Priority Data

Feb. 22, 2017 (JP) .................................. 2017-031382

(51) Int. Cl.
*G03G 15/00* (2006.01)
*H04N 1/409* (2006.01)

(52) U.S. Cl.
CPC ......... *G03G 15/5025* (2013.01); *H04N 1/409* (2013.01); *G03G 2215/0439* (2013.01)

(58) Field of Classification Search
None
See application file for complete search history.

(56) References Cited

U.S. PATENT DOCUMENTS

| 7,952,752 B2 | 5/2011 | Shoji |
| 9,251,445 B2 * | 2/2016 | Arai .................... G06K 15/1876 |
| 9,268,252 B2 | 2/2016 | Shoji |
| 9,298,124 B2 * | 3/2016 | Araki ..................... G03G 15/50 |

FOREIGN PATENT DOCUMENTS

JP   2007-272153 A   10/2007

* cited by examiner

*Primary Examiner* — Victor Verbitsky
(74) *Attorney, Agent, or Firm* — Venable LLP (57) ABSTRACT

An image forming apparatus obtains a number of pixels to be developed on a downstream side in a sub-scanning direction from each one of the predetermined pixels, in order to correct a density increase that occurs at the trailing edge of an image to be formed in accordance with a peripheral speed difference between a photosensitive drum and a developing roller, determines a correction amount of light amount for each one of the predetermined pixels in accordance with the obtained number of pixels, and generates image formation data.

6 Claims, 8 Drawing Sheets

IMAGE FORMING APPARATUS, METHOD OF CONTROLLING THE SAME, AND STORAGE MEDIUM

BACKGROUND OF THE INVENTION

Field of the Invention

The present invention relates to an image forming apparatus, a method of controlling the same, and a storage medium.

Description of the Related Art

In an image forming apparatus of an electronic photographic method, when the surface speed of a developing roller is faster than the surface speed of a photosensitive drum, it is easy for an excessive portion of an amount of adhered toner to occur in accordance with the shape of a drawn exposure latent image. From when these surfaces enter a developing region and until they leave the developing region, the surfaces of the photosensitive drum and the developing roller that face each other shift little-by-little in accordance with the speed difference. The speed difference is referred to as a peripheral speed difference.

A scan latent image of a photoreceptor surface collects toner from an area that widens on a rear end side in a conveyance direction at a time of developing, and areas for collecting toner for each scan mutually overlap on the developing roller. Because a region having many non-printing portions on the rear end side in the conveyance direction in accordance with the shape of a latent image can monopolize toner on the developing roller which is catching up, printing density is likely to increase. Such a density increase of the trailing edge of an image is expressed as sweeping. Sweeping is a type of image degradation in which an image that differs from a latent image drawn by light is outputted as a print result, and in the electronic photographic method mentioned above, various countermeasures are applied in order to reduce sweeping.

Out of these countermeasures, there is a method for detecting a density increase portion and suppressing an amount of light of pixels as processing for causing sweeping to reduce in accordance with light amount correction of a latent image. In sweeping reduction processing in accordance with a light amount correction of a latent image, there remains a problem of the movement or re-occurrence of a sweeping portion when light amount reduction processing for a region of a density increase of a print result is performed when there is no correction of the amount of light. For example, with respect to sweeping illustrated in FIG. 6B which is described later, when an amount of light is caused to reduce by a signal value correction illustrated in FIG. 7A, a new density increase occurs in a location that was flat as illustrated in FIG. 7B. This means that, by reducing the amount of light for pixels of the first sweeping region, remaining toner that does not adhere to the photosensitive drum at these pixels increases, and because these pixels catch up with pixels in an image leading edge direction (sweeping region) in accordance with the peripheral speed difference, the sweeping region simply moves upstream of the conveyance direction. Note that, for FIG. 6B, the ordinate indicates actual drawing density in a case where a light amount correction is not performed, and the abscissa indicates a sub-scanning position. For FIG. 7A, the ordinate indicates a corrected signal value, and the abscissa indicates a sub-scanning position. For FIG. 7B, the ordinate indicates actual drawing density in a case where the correction in FIG. 7A is performed, and the abscissa indicates a sub-scanning position. To handle such a movement of a density increase portion, Japanese Patent Laid-Open No. 2007-272153 proposes a method for implementing repetitive processing for widening a processing range with respect to a phenomenon where a sweeping region moves upstream in a conveyance direction.

However, there is a problem as is recited below in the foregoing conventional technique. In the foregoing conventional technique, in a calculation of a region for performing a correction, when a data value after correction of a pixel set as a correction target is less than a data value of a specific pixel positioned on an upstream side in a sub-scanning direction by an interval decided in a calculation from the pixel, a correction region is further set for the specific pixel on the upstream side. In other words, such resetting of the correction region and re-correction processing is repeated, and a density variation newly occurring at other pixels due to the influence of the correction is corrected. However, in an image forming apparatus for processing a large amount of image information, such repetitive processing is not desirable due to a large computational load.

SUMMARY OF THE INVENTION

The present invention enables realization of a mechanism for improving reproducibility of a latent image by suitably correcting for an influence due to sweeping, without introducing an increase of a processing load.

One aspect of the present invention provides an image forming apparatus, comprising: a photosensitive drum; an exposure unit configured to expose the photosensitive drum to form an electrostatic latent image on a surface of the photosensitive drum; a developing roller configured to develop the electrostatic latent image formed on the surface of the photosensitive drum by using a developer; a memory device that stores a set of instructions; and at least one processor that executes the instructions to: for each predetermined pixel of a plurality of pixels of image data to be formed, obtain a number of pixels to be developed on a downstream side in a sub-scanning direction from the predetermined pixel, in order to correct a density increase that occurs at a trailing edge of an image to be formed in accordance with a peripheral speed difference between the photosensitive drum and the developing roller, determine a correction amount of light amount for each predetermined pixel of the plurality of pixels in accordance with the obtained number of pixels, and generate image formation data using the correction amount of light amount determined for each predetermined pixel, wherein the correction amount of light amount is determined to be a fixed correction amount of light amount at a trailing region of the image where the density increase occurs, and is determined so that it smoothly reduces from the fixed correction amount of light amount in a predetermined region width from a leading edge side of the trailing region toward the leading edge side of the image.

Another aspect of the present invention provides a method of controlling an image forming apparatus provided with a photosensitive drum, an exposure unit operable to expose the photosensitive drum to form an electrostatic latent image on a surface of the photosensitive drum, and a developing roller operable to develop the electrostatic latent image formed on the surface of the photosensitive drum by using a developer, the method comprising: for each predetermined pixel of a plurality of pixels of image data to be formed, obtaining a number of pixels to be developed on a downstream side in a sub-scanning direction from the predetermined pixel, in order to correct a density increase that occurs at a trailing edge of an image to be formed in accordance with a peripheral speed difference between the photosensitive drum and the developing roller, determining a correction amount of light amount for each predetermined pixel of the plurality of pixels in accordance with the obtained number of pixels, and generating image formation data using the correction amount of light amount determined for each predetermined pixel, wherein the correction amount of light amount is determined to be a fixed correction amount of light amount at a trailing region of the image where the density increase occurs, and is determined so that it smoothly reduces from the fixed correction amount of light amount in a predetermined region width from a leading edge side of the trailing region toward the leading edge side of the image.

Still another aspect of the present invention provides a computer-readable storage medium storing a computer program for causing a computer to execute each step of a method of controlling an image forming apparatus provided with a photosensitive drum, an exposure unit operable to expose the photosensitive drum to form an electrostatic latent image on a surface of the photosensitive drum, and a developing roller operable to develop the electrostatic latent image formed on the surface of the photosensitive drum by using a developer, the method comprising: for each predetermined pixel of a plurality of pixels of image data to be formed, obtaining a number of pixels to be developed on a downstream side in a sub-scanning direction from the predetermined pixel, in order to correct a density increase that occurs at a trailing edge of an image to be formed in accordance with a peripheral speed difference between the photosensitive drum and the developing roller, determining a correction amount of light amount for each predetermined pixel of the plurality of pixels in accordance with the obtained number of pixels, and generating image formation data using the correction amount of light amount determined for each predetermined pixel, wherein the correction amount of light amount is determined to be a fixed correction amount of light amount at a trailing region of the image where the density increase occurs, and is determined so that it smoothly reduces from the fixed correction amount of light amount in a predetermined region width from a leading edge side of the trailing region toward the leading edge side of the image.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Configuration of Image Forming Apparatus>

Below, description will be given for a first embodiment of the present invention. First, with reference to FIG. 1, description is given regarding an example of a configuration of an image forming apparatus. An image forming apparatus 10 is mainly configured from an image forming unit 100 and a printing mechanism 150.

Figure 1:
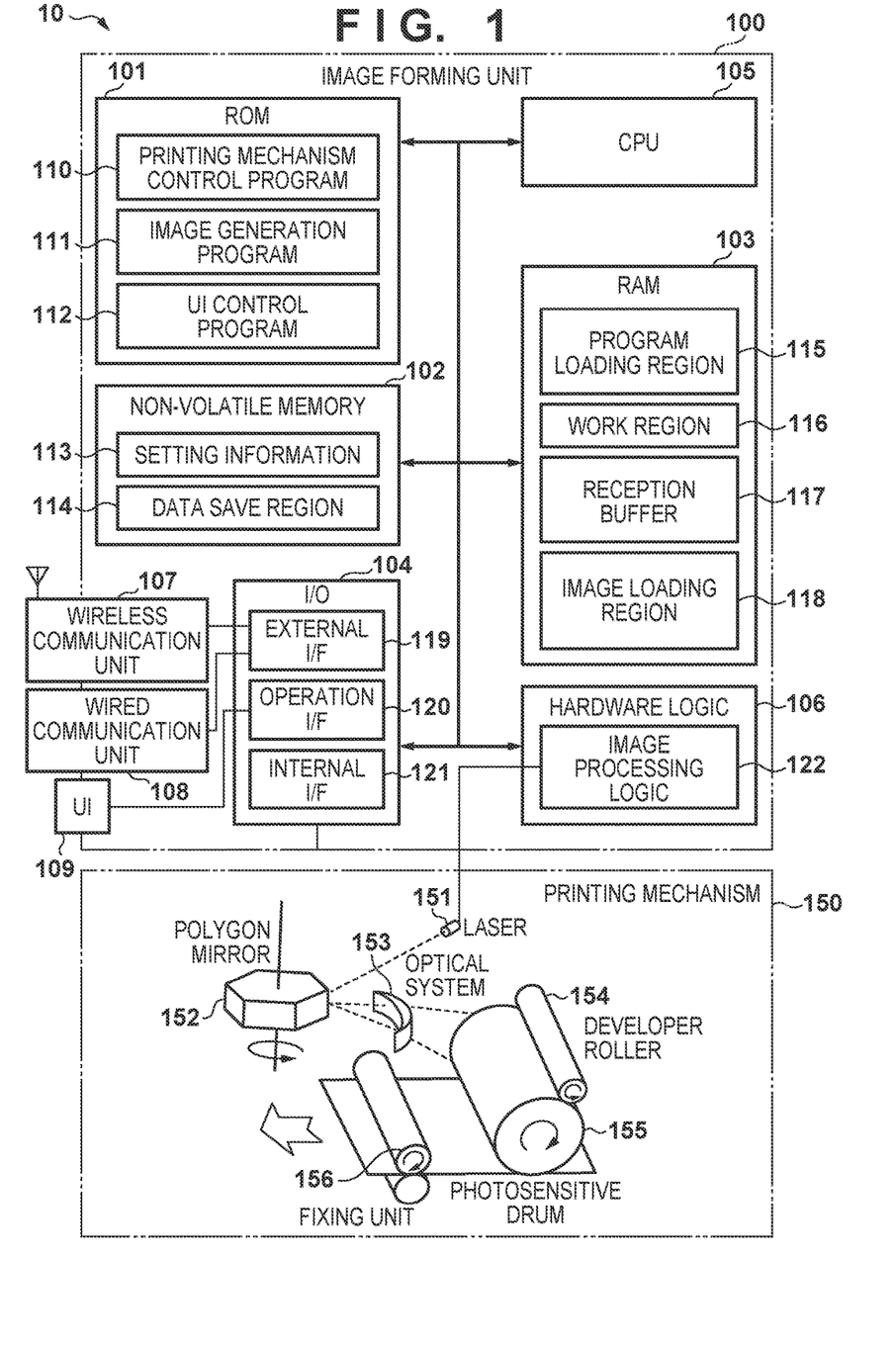
FIG. 1 is an overview configuration diagram of an image forming apparatus.

The image forming unit 100 is configured from memories of a plurality of types, an input/output unit, and hardware logic. Reference numerals 101 through 103 are all storage elements, and while they can be integrated in accordance with the development of a device, there are differences in the characteristics of each at the current time, and a configuration in which these elements are used differently is illustrated. The ROM 101 is a memory whose contents do not disappear even at a time of a power disconnection. The ROM 101 stores data that does not require change, such as a printing mechanism control program 110, an image generation program 111, and a UI control program. The non-volatile memory 102 is a memory that can be rewritten, and for whose contents do not disappear even at a time of a power disconnection. The non-volatile memory 102 stores data for which rewriting of information may occur but for which disappearing at a time of a power disconnection is not desired, such as a data save region 114 or setting information 113 of the image forming apparatus. The RAM 103 is a memory whose contents disappear at a time of a power disconnection. A program loading region 115, a work region 116, a reception buffer 117, and an image loading region 118 are allocated in the RAM 103. An I/O 104 is an input/output port. The I/O 104 includes an external I/F (interface) 119, an operation I/F 120, and an internal I/F 121, and performs control of internal mechanism of the image forming apparatus 10, transmission/reception of information with an external device, and control of an operation panel.

The CPU 105 operates based on respective programs in the ROM 101, or an additional program in the program loading region 115. The CPU 105 refers to the setting information 113 at a time of execution of each program to control respective units or mechanisms via the I/O 104, and generate print image information.

Hardware logic 106 is in charge of processing for which an execution speed or timing in particular are viewed as important from among processing similar to that of the CPU 105, and executes control of respective mechanical units, and processing or generation of print image information. The hardware logic 106 is in charge of processing for which generation of a timing in the CPU 105 is difficult, and executes a PWM conversion or a pixel timing adjustment at a time of light drawing, for example. The hardware logic 106 includes various processing logic such as image processing logic 122.

A wireless communication unit 107 performs transmission/reception of information with an external device by wireless communication with the external device, and performs exchanges with the interior of the image forming apparatus 10 via an external I/F 119. A wired communication unit 108 performs transmission/reception of information with an external device by wired communication with the external device, and performs exchanges with the interior of the image forming apparatus 10 via the external I/F 119.

A UI (user interface) 109 accepts a user operation relating to a setting or the like of the image forming apparatus 10 without going through an external device, and controls, for example, a display of a setting or a state of the image forming apparatus 10. The UI 109 is configured by at the least a display unit such as a display panel or a light emitting element for stimulating vision of a human, and an input unit such as a touch panel or a switch that can be operated manually, but the UI 109 may have a different input unit or unit for stimulating perception. As a different unit for stimulating perception, for example there is a unit for stimulating auditory perception such as audio, and as examples of different input units, there is an audio input unit that is in accordance with speech, or input such as an operation in accordance movement of a line of sight.

The printing mechanism control program 110 stored in the ROM 101 is a program for controlling a procedure for appropriately controlling each mechanical unit of the printing mechanism 150 to successfully discharge print output material. The printing mechanism control program 110, by being executed, controls a high voltage system of the printing mechanism 150, a conveyance system, a light amount control system, a thermal fixation system, or the like. The image generation program 111 generates a print image on the image loading region 118 based on print information stored in the reception buffer 117 that has been received from an external device via the wireless communication unit 107 or the wired communication unit 108. A UI control program 112 monitors input from the UI 109 via the operation I/F 120, performs exchanges with the interior of the image forming apparatus 10, and presents information to a perception unit.

The setting information 113 of the non-volatile memory 102 holds information that can be changed. It holds information that can be changed but is information that needs to be held even at a power disconnection, such as a setting of an amount of time for entering a sleep state, user security management information, paper information, or the like, for example. The data save region 114 holds information of all regions of the RAM 103. It is used when holding a print image of a fixed format, or when holding a print image until a fixed date/time for management purposes, for example.

The program loading region 115 of the RAM 103 is used in accordance with convenience for a hardware configuration to be able to refer to a program faster, or when additionally using a program that is not in the ROM 101. The work region 116 is used as a storage region for various data in intermediary stages for generation of a print image. The reception buffer 117 is a region for temporarily storing data sent from an external device via the wireless communication unit 107 or the wired communication unit 108. A print image for light drawing by a printing mechanism is loaded into the image loading region 118 from image information received in the reception buffer 117.

The external I/F 119 is an interface in the I/O 104 for exchanging information with an external device, and controls the wireless communication unit 107 or the wired communication unit 108 to send and receive information with respect to the external device. The operation I/F 120 is an interface for controlling the UI 109, and performs reading from an input unit or outputting to a display unit for presentation of information prepared in the image forming apparatus. The internal I/F 121 is an interface for each unit of the printing mechanism 150, and controls each unit based on the printing mechanism control program 110.

The image processing logic 122 further converts data on the image loading region 118 to a laser driving signal, to generate a laser driving signal for the printing mechanism 150 in accordance with a print image and drive a laser 151 (an exposure unit). When image data loaded into the image loading region 118 is multi-valued, the image processing logic 122 converts the multi-value thereof into an amount of light to drive the laser 151 as a laser driving signal. As a method for controlling the amount of light of the laser beam amount, in the present embodiment, a PWM conversion for controlling a light-emitting time within one pixel is applied. Note that adjustment of an output light amount in accordance with a correction amount in the present invention is similarly performed in accordance with a PWM conversion. When the total number of a PWM conversion is low, a necessary tonal number for the amount of light is allocated such as by halftone processing in which a plurality of pixels are combined, as necessary. In addition, in a case where a correction amount calculation in the present invention is implemented in hardware, processing is performed after the construction of, for example, a lookup table, a determination circuit, or a line buffer for holding a plurality of pieces of scan information for referring to neighboring pixels.

Next, description is given regarding main configurations of the printing mechanism 150 according to the present embodiment. In the present embodiment, illustration is given for a mechanical configuration in which a laser light source, as an exposure light source, scans in accordance with a polygon mirror, but a different exposure unit may be used and similarly applied. The laser 151 is a light rendering source. A polygon mirror 152 scans a laser beam produced from the laser 151. An optical system 153 converts equiangular scanning of light reflected from the scanned polygon mirror 152 to constant speed scanning on a photosensitive body. By the laser 151, the polygon mirror 152, and the optical system 153, it is possible to generate on the photosensitive body an optical image in a first dimension direction that is orthogonal to a conveyance direction. Furthermore, by making the shape of the photosensitive body be a cylindrical shape as with the photosensitive drum 155 and causing it to rotate, different positions are scanned, and a two-dimensional scan is realized.

The light drawing is performed by the laser 151 onto the photosensitive drum 155 which rotates and whose surface has been uniformly charged by a charging mechanism (not shown). Consequently, a current flows at the corresponding portion, the charge is lost, and a two-dimensional potential latent image is formed from the optical scanning image. Because the laser 151 is drawn based on the image information, the latent image corresponds to the print image. The developer roller 154 is provided so as to neighbor or contact a drum surface in a state where toner is caused to uniformly adhere to a surface of the roller, and supplies the toner to the surface of the photosensitive drum 155. After the toner supply, a gap on the surface of the developer roller 154 is supplied with toner again in accordance with a toner container (not shown), before facing the photosensitive drum 155 again. Out of toner supplied to the surface of the photosensitive drum 155, toner facing the two-dimensional latent image on the photosensitive body moves to the photosensitive drum 155, and the latent image is developed.

In a case of facing a charged portion where the two-dimensional latent image is not present, the toner remains on the developer roller 154 as is without the occurrence of movement from the developer roller 154, and results in a negative image of the print image. The remaining toner image on the developer roller 154 is uniformly filled in by toner supplied from the toner container, in accordance with rotation, and subsequent developing is performed. The toner image generated on the photosensitive drum is transferred to a conveyed sheet, fixed to the sheet in accordance with heating and pressurization by a fixing device 156, and completed as an output article.

<Principle for Occurrence of Sweeping>

Next, description is given regarding sweeping where a print density noticeably increases at a rear end side in a conveyance direction (a trailing edge of an image). Sweeping can be noticeably seen at the trailing edge of an image, but with a configuration where there is a peripheral speed difference between the photosensitive drum 155 and the developer roller 154, is a general phenomenon that occurs on the entire surface of an image. Here, a case in which the surface speeds of the photosensitive drum 155 and the developer roller 154 differ, in other words there is a peripheral speed difference therebetween, and the surface speed of the developer roller 154 is slightly faster is envisioned.

Figure 8A:
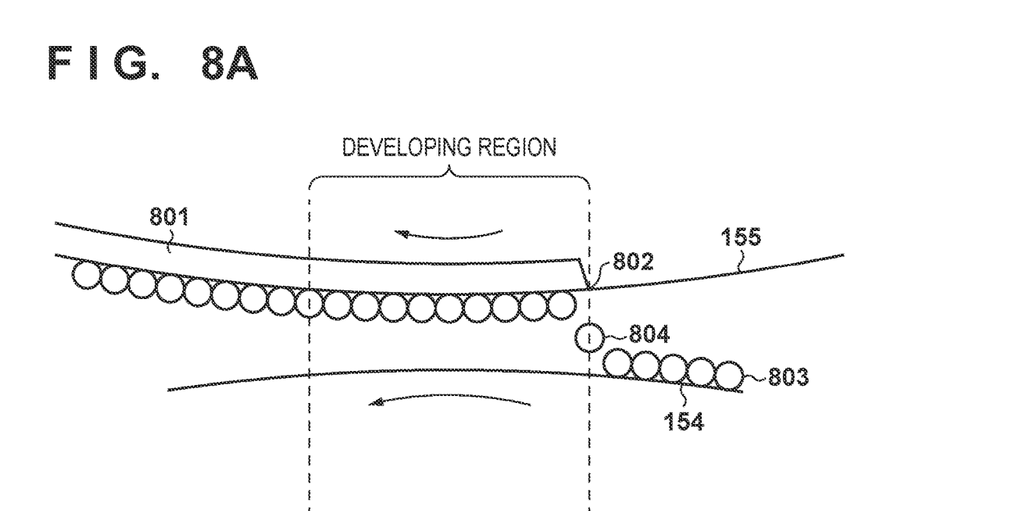
FIG. 8A through FIG. 8C are views for describing sweeping.
Figure 8B:
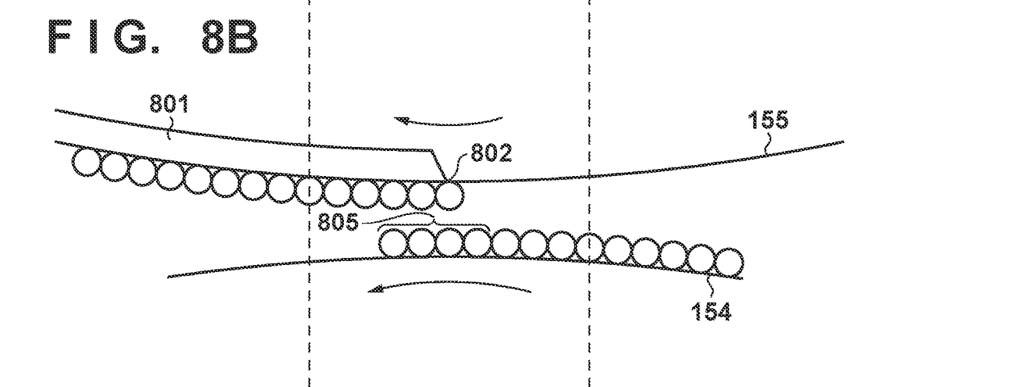
Figure 8C:
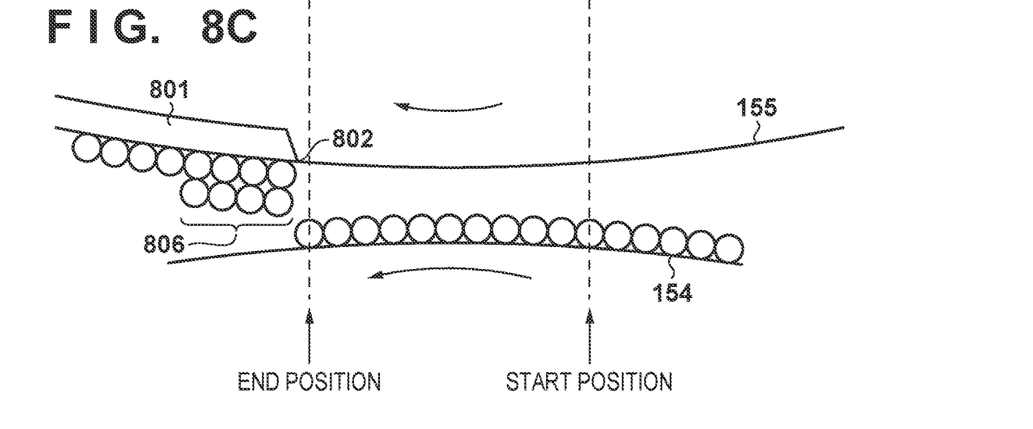

FIG. 8A through FIG. 8C illustrate states in which the trailing edge of an image is developed. FIG. 8A illustrates a state in which, at a developing region, an electrostatic latent image in accordance with toner 803 conveyed to the developing region by the developer roller 154 is developed. Reference numeral 801 indicates the electrostatic latent image, and reference numeral 802 indicates an electrostatic latent image trailing edge (the trailing edge of an image). Reference numeral 804 indicates toner (developer) attracted from the developer roller 154 to the photosensitive drum 155 by the potential of the electrostatic latent image. In the image forming apparatus 10 according to the present embodiment, because the developer roller 154 rotates faster than the photosensitive drum 155, a positional relationship between the surfaces of the two continues to shift at all times.

Accordingly, FIG. 8B indicates a state where pixels on the developer roller 154 on a downstream side of the trailing edge of an image overtakes the trailing edge of the image after developing. Specifically, the toner 803 on the developer roller 154 positioned on a rear side (a downstream side) in the conveyance direction from a start position of the developing region when the electrostatic latent image trailing edge 802 entered the developing region overtakes the electrostatic latent image trailing edge 802 in a period before the electrostatic latent image trailing edge 802 reaches an end position where the electrostatic latent image trailing edge 802 emerges from the developing region.

In this way, after developing is performed with respect to the latent image in the developing region, the surface portions of the developer roller 154 corresponding to downstream pixels positioned on a downstream side from the developing portion successively catch up and face the drum. Toner in the shape of an inversion of the latent image remains on the surface of the developer roller 154, and, for the latent image on the photosensitive drum 155, a potential for attracting toner remains to a certain degree even after the latent image is initially developed. Accordingly, when the inverted toner image for downstream pixels on the developer roller 154 catches up, the remaining toner is attracted to the latent image, and a density increase occurs, as illustrated in FIG. 8C. In other words, sweeping occurs. In addition, the foregoing principle is not limited to a developing method where an image carrier (the photosensitive drum 155) and a developer carrier (the developer roller 154) are in contact but holds true even for a method in which developing is performed in a non-contact state if there is a range in which proximity developing on which the influence of an edge effect is low.

Note that, for the toner image developed on the photosensitive drum 155, a portion where toner is additionally received and a portion where only toner from an initial facing portion is received occur in accordance with the existence or absence of toner 805 at a portion that caught up with the developer roller 154, even if drawing is performed at the same potential. In such a case, the portion that additionally received toner is noticeably recognizable as sweeping.

In this way, an region width (a distance) on the developer roller 154 where toner positioned on a rear side in the sub-scanning direction catches up with the electrostatic latent image trailing edge 802 due to the peripheral speed difference while the electrostatic latent image trailing edge 802 passes through the developing region is referred to as a catch-up width.

The existence or absence of the toner 805 on a portion where the developer roller 154 catches up is determined in accordance with the inverted toner image on the developer roller 154 after development of downstream pixels. Accordingly, the image forming apparatus 10 according to the present embodiment calculates the magnitude of the toner amount from an arrangement of downstream pixels, estimates a toner amount that adheres excessively, and performs a light amount correction so as to resolve the sweeping. When the downstream pixels are all drawn pixels, there is no inverted toner image (remaining toner) on the developer roller 154 and nothing happens, but when a pixel that is not drawn is mixed among the downstream pixels, remaining toner is present on the developer roller 154 which faces the drum when it catches up. Accordingly, there is a need to determine the light amount correction from the arrangement (shape) of the downstream pixels.

Figure 2A:
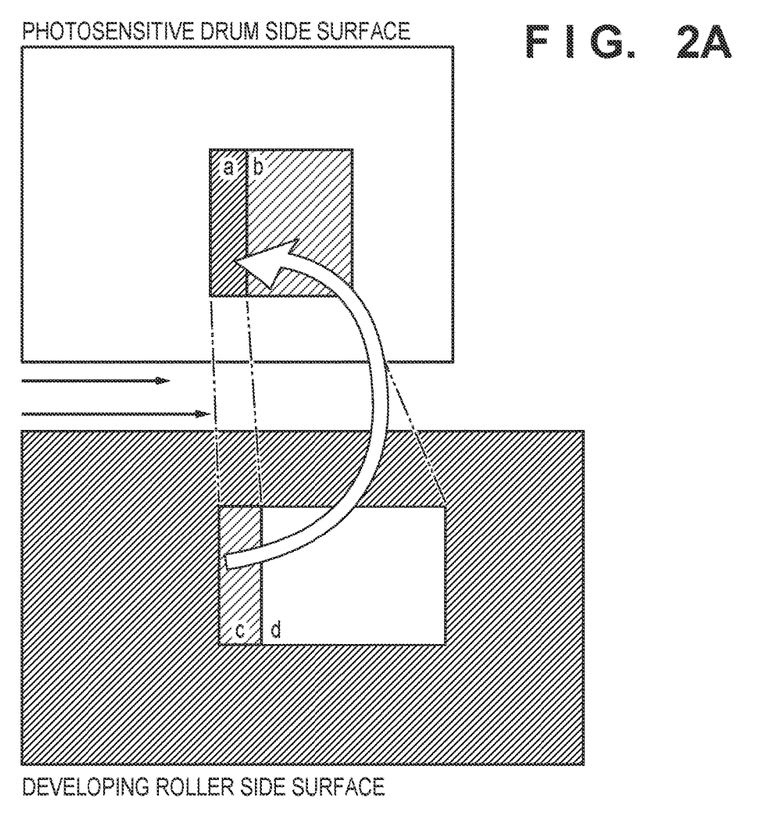
FIG. 2A through FIG. 2C are views of a photosensitive drum 155 side surface and a developer roller 154 side surface facing each other.
Figure 2B:
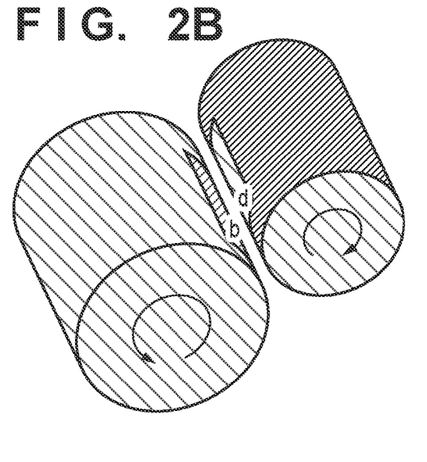
Figure 2C:
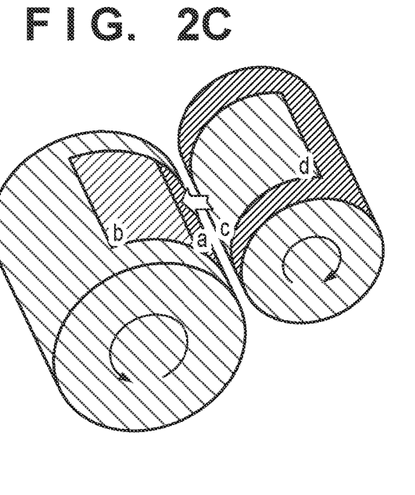

Next, with reference to FIG. 2A through FIG. 2C, a reduction of sweeping is structurally described. FIG. 2A illustrates a view of a photosensitive drum 155 side surface and a developer roller 154 side surface. Regions a and b on the surface of the photosensitive drum 155 are latent image regions that have been developed. Here, because the circumferential speed of the surface of the developer roller 154 is faster, a region c+d to which toner is supplied by developing is longer than the length of print images a+b.

Although the leading edges of b and d face each other at a time of entry to the developing region as illustrated in FIG. 2B, because the developer roller 154 moves slightly faster due to the peripheral speed difference, a portion of c gradually catches up to the latent image. Due to the peripheral speed difference, a time when the latent image passes the developing region means passing the developing region in a form where the trailing edge of the region a faces the trailing edge of the region c, as illustrated in FIG. 2C.

Part of the toner at a portion of the region c that should not move to the surface of the photosensitive drum 155 if there was no peripheral speed difference is drawn in by the remaining charge of the latent image of the region a in accordance with catching up due to the peripheral speed difference, and moves to the region a, and thus the amount of adhered toner for the region a increases. In this way sweeping occurs, and the density increase in the trailing edge of an image is noticeably seen.

<Correction of Sweeping>

Next, description is given regarding sweeping correction control according to the present embodiment. In the present embodiment, by preventing sweeping as described above, improvement of defective fixing and economization of toner are realized. Correction control according to the present embodiment corrects a drawn amount of light for image data for forming a latent image to suppress this electric potential latent image to thereby suppress the consumption amount of toner 13 used at a region where sweeping occurs. An amount of sweeping that occurs is determined in accordance with a remaining toner amount on the developer roller 154 that catches up, but this is determined in accordance with an arrangement of a group of downstream pixels in the conveyance direction.

Firstly, the inverted toner image which has a phase that is the reverse of the developed image is generated on the developer roller 154, but this depends on a pixel arrangement of the downstream pixels. Furthermore, before the inverted toner image reaches a target pixel, remaining toner is attracted to pixels that were drawn so far and the remaining toner amount also gradually decreases, but this is also determined by the pixel arrangement of the downstream pixels.

The phenomenon in which the sweeping region moves upstream in the conveyance direction due to a countermeasure by the aforementioned conventional technique being performed occurs by toner, which remains because the potential of intermediate drawn pixels is suppressed, reaching further towards a leading edge side from the trailing edge of an image. Because remaining potential after developing is present at all drawn portions, potentially all drawn portions can be a region where sweeping occurs. However, the sweeping is apparent in only a trailing edge because it is only the trailing edge of an image where remaining toner is supplied due to the developing roller catching up. Accordingly, in a case where processing for correcting the light amount for the trailing edge of an image is performed to suppress the occurrence of sweeping, toner remaining on the developer roller 154 reaches a region where the amount of light has not been corrected, and the apparent portion for sweeping moves.

In the conventional technique described above, a processing load becomes very high because it is necessary to repeatedly redefine a correction region and perform re-correction processing with respect to the phenomenon in which sweeping moves, in order to set a density variation portion as a correction region. In addition, when a correction region is made to be variable, the cost of holding image data increases at a time of implementing hardware.

Accordingly, in the present invention, it is considered that all drawn pixels are latent sweeping occurrence regions, and as described above using FIG. 8A through FIG. 8C, a catch-up width for the developer roller 154 is further defined inside a portion of the trailing edge of an image where the density varies. A light amount correction is thus also performed with respect to a portion where density does not vary in a distance equal to the catch-up width of the developer roller 154 from the portion where the density varies. For an additional light amount correction, a correction amount of light amount is defined as 0 at a position for the catch-up width of the developer roller 154, and the amount of light is caused to change (gradually) in a slope shape so as to be equal to a light amount reduction value for a density variation portion at a portion that contacts with the density variation portion.

Figure 6A:
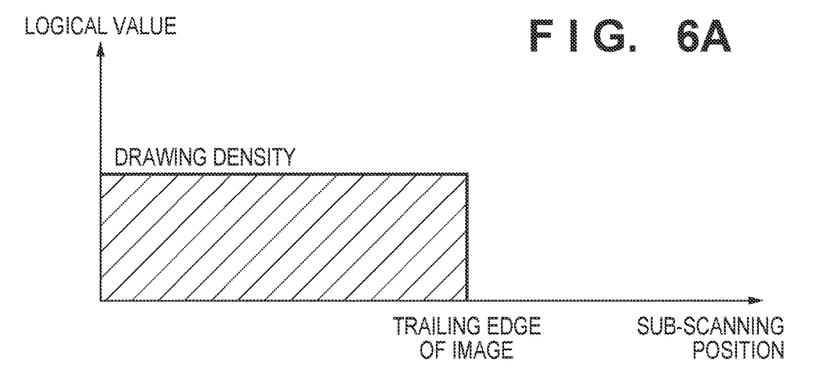
FIG. 6A through FIG. 6C are views for describing a light amount correction according to an embodiment.
Figure 6B:
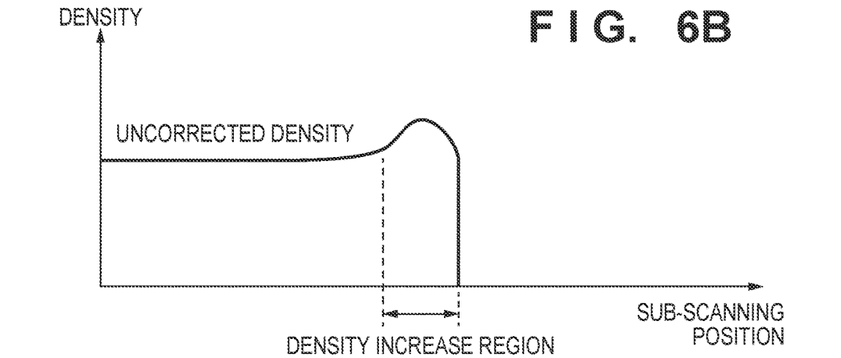
Figure 6C:
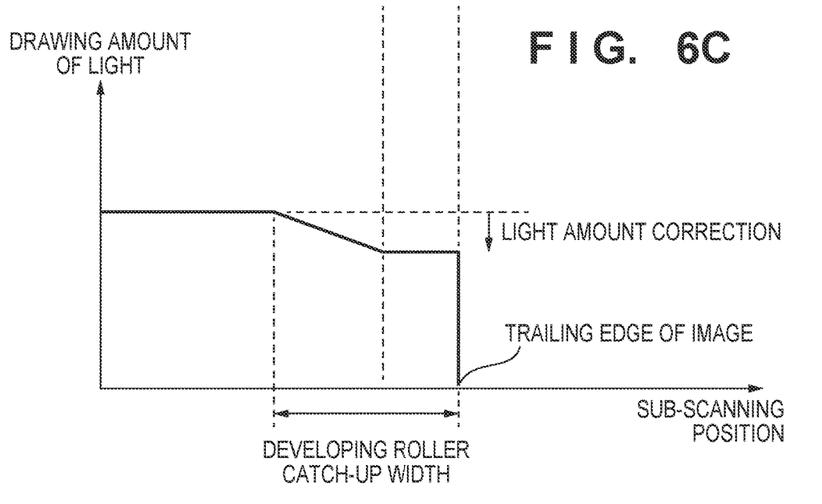
Figure 7A:
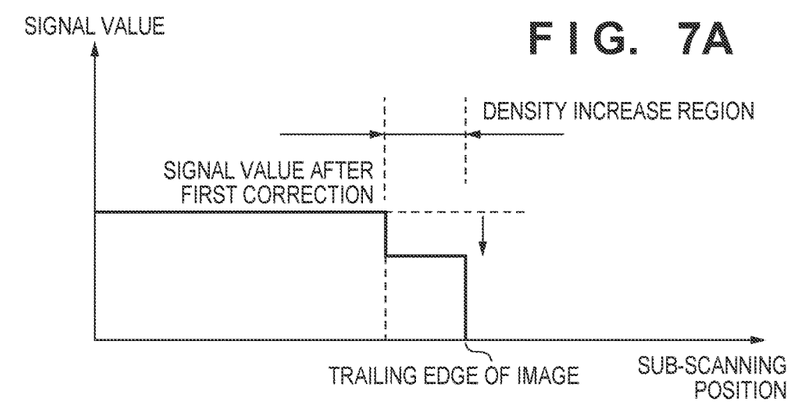
FIG. 7A through FIG. 7C are views illustrating movement of sweeping in a sweeping correction in a comparative example.
Figure 7B:
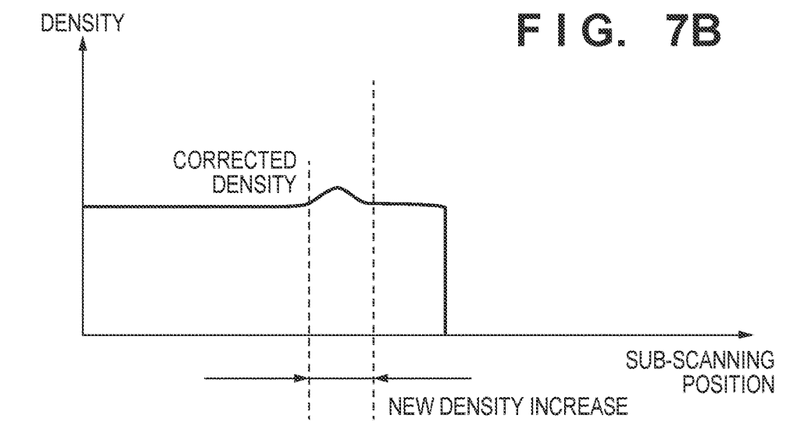

Here, with reference to FIG. 6A through FIG. 6C, description is given regarding light amount correction control. In FIG. 6A the ordinate indicates a logical value of a drawing density (an expected value), and the abscissa indicates a sub-scanning position. For FIG. 6B, the ordinate indicates actual drawing density in a case where a light amount correction is not performed, and the abscissa indicates a sub-scanning position. In FIG. 6C the ordinate indicates an amount of light drawn according to the present embodiment, and the abscissa indicates a sub-scanning position.

FIG. 6A has logical drawing information, but when light drawing is performed with no correction, a sweeping density increase region occurs as illustrated in FIG. 6B. Accordingly, with respect to a portion where density does not vary until the catch-up width of the developer roller 154, as illustrated in FIG. 6C a fixed correction amount of light amount is set in a trailing region of the density increase region, and the above fixed correction amount of light amount is smoothly reduced from the leading edge side of the trailing region toward the leading edge of the image to connect with the uncorrected value for density.

Figure 7C:
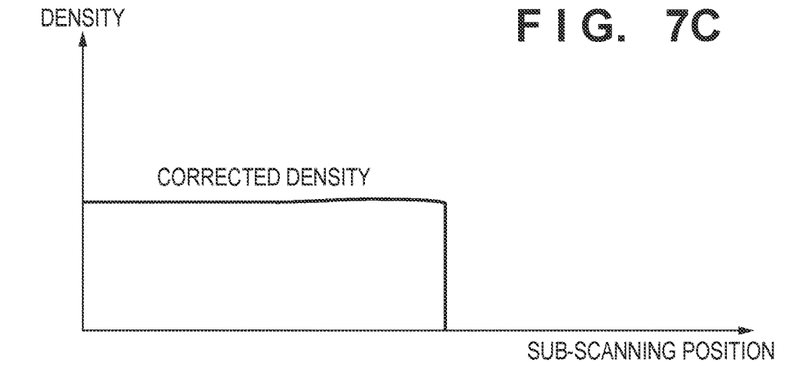

By correcting the amount of light as illustrated in FIG. 6C, it is possible to achieve a print output result in which there is no sweeping as illustrated in FIG. 7C. In order to achieve a suitable correction amount of light amount and catch-up width for the developer roller 154 in the developing region in FIG. 6C, optimal correction values under various print conditions such as an environment and a sheet used are obtained by measuring them in advance.

An amount of remaining toner at a predetermined position due to the developer roller 154 catching up increases the more pixels there are that are not drawn among the downstream pixels. However, there is of course an upper limit for non-print pixels included in the catch-up width of the developer roller 154, and the amount of toner has an upper limit because it does not increase more than this. However, for the remaining toner that remains on the developer roller 154, if there are other drawn pixels between a target pixel and downstream pixels, there is a chance that the other drawn pixels will face and pull in the remaining toner first, and the remaining toner decreases the more other drawn pixels there are before the remaining toner faces the target pixel.

Figure 3A:
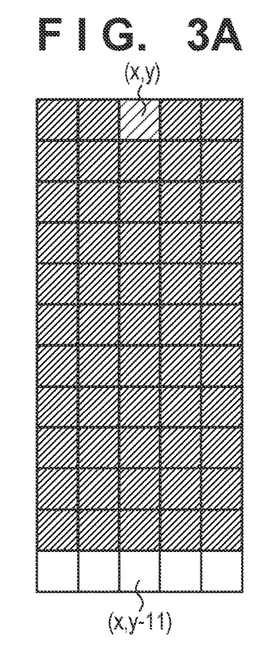
FIG. 3A through FIG. 3E are views illustrating distribution shapes of downstream pixels of a trailing edge of an image.

FIG. 3A through FIG. 3E illustrate situations where there is a downstream pixel in the developing region width, and neighboring pixels thereof. With respect to a target pixel (x, y), a downstream pixel (x, y-11) in the developing region width in FIG. 3A is a non-drawn pixel, and there is remaining toner on the developer roller 154 corresponding to the position of this pixel, and this remaining toner catches up within the developing region. Simultaneously, the toner image inverted on the developer roller 154 at (x, y-11) faces all of the intermediate drawn pixels (x, y-1) through (x, y-10) before facing the target pixel (x, y), is attracted to the photosensitive drum 155 by the remaining potential of these drawn pixels, and toner decreases little-by-little.

For example, to simplify the description, it is assumed that a drawn pixel pulls in $\frac{1}{10}$ of the remaining toner. In such a case, no toner remains at the position on the developer roller 154 corresponding to the non-drawn pixel (x, y-11) by the target pixel (x, y). In practice, under the conditions of FIG. 3A, a correction amount for light drawing intensity is small, and the amount of light is only slightly subject to a weak correction.

Figure 3B:
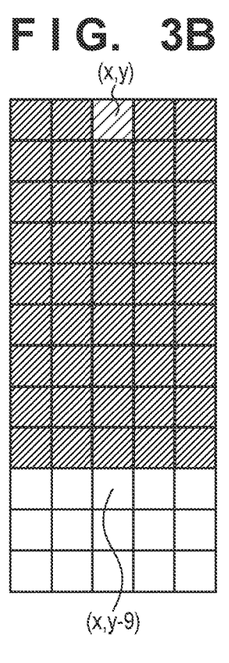
Figure 3C:
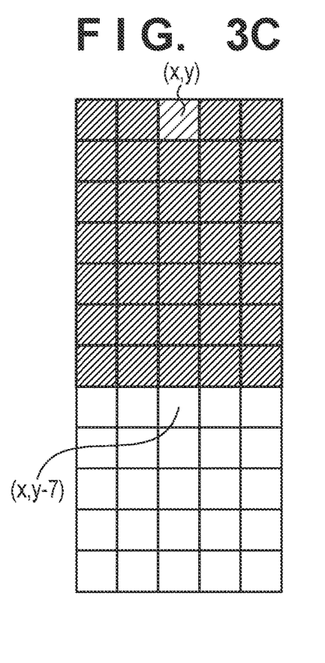
Figure 3D:
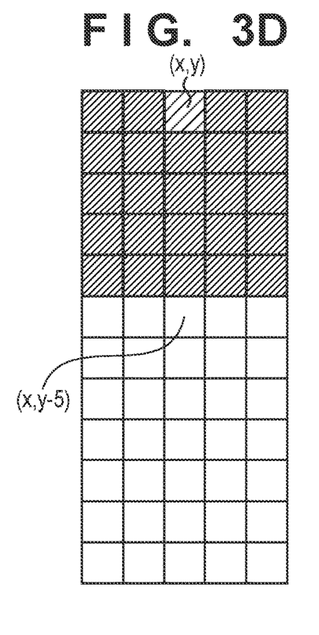

In FIG. 3B, three pixels out of the downstream pixels (x, y-9) through (x, y-11) are non-drawn pixels, and the remaining toner amount on the inverted toner image on the developing roller is larger than in FIG. 3A. Even in this case, the non-drawn pixels will face eight intermediate pixels, (x, y-1) through (x, y-8) before facing the target pixel (x, y), and toner will be attracted by the remaining latent image. However, even if it is simplified by assuming that each drawn pixel attracts ⅓ of one pixel's worth of remaining toner, ⅓ of one pixel's worth will reach the target pixel (x, y). Accordingly, it is predicted that a density increase for the target pixel (x, y) will be greater than in FIG. 3A, and there is a need to set the correction amount for the light drawing intensity to be larger than in FIG. 3A. Similarly, as the number of non-drawn pixels for the downstream pixels increase and intermediate drawn pixels decrease as illustrated in FIG. 3C and FIG. 3D, there is a need to set the correction amount larger.

Figure 3E:
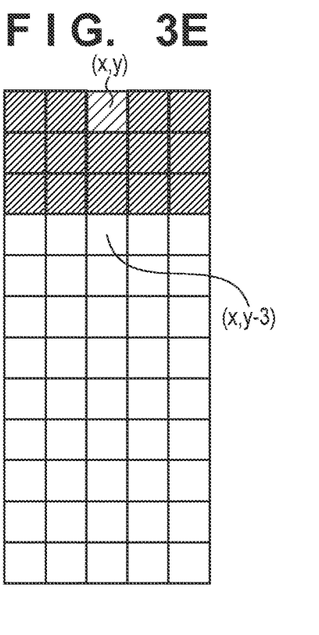

Note that, even in a case where toner is abundantly supplied, because toner does not adhere when the remaining potential of the target pixel (x, y) is exceeded, the density increase is saturated at all stages. For example, in order to simplify the description, the case of FIG. 3E is described by assuming that each drawn pixel attracts ½ of one pixel's worth of remaining toner. In FIG. 3E, (x, y-1) through (x, y-2) only attract one pixel's worth of remaining toner for (x, y-3), and eight pixel's worth of toner for (x, y-4) through (x, y-11) is supplied to the target pixel (x, y). This is clearly supply in excess, and will cause saturation of a density increase for the target pixel, and will cause the density to increase until further upstream pixels are reached.

Figure 4A:
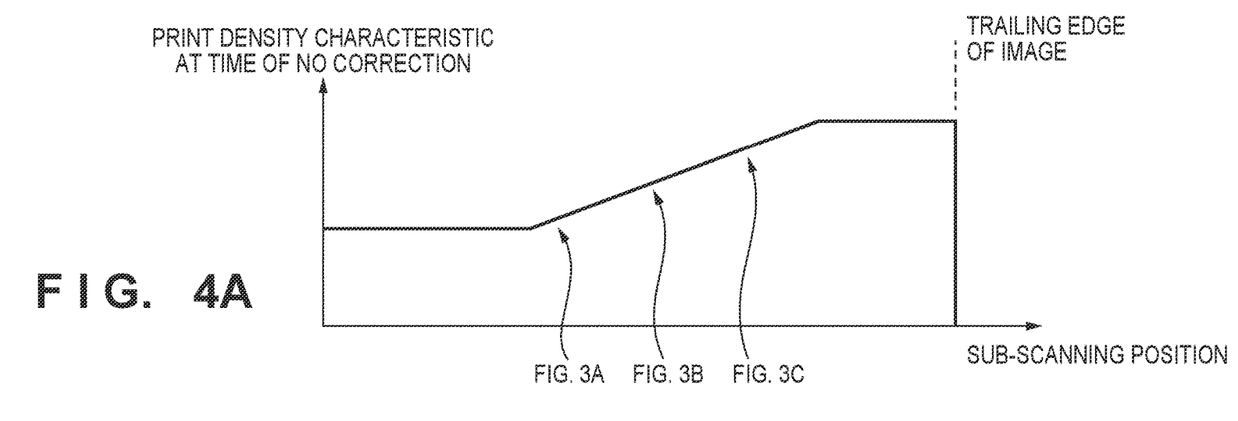
FIGS. 4A and 4B are views illustrating a density characteristic and a light amount correction of a trailing edge of an image.

Here, correspondence between a density characteristic and a pixel arrangement of downstream pixels illustrated in FIG. 3A through FIG. 3E is illustrated in FIG. 4A. A light amount reduction value with respect to a portion where density increases (for example, positions corresponding to FIG. 3B through FIG. 3E) is allocated as a characteristic for a correction light amount in order to correct the density characteristic illustrated in FIG. 4A. In contrast, for a region where the remaining toner amount on the developer roller 154 from the downstream pixels does not reach (for example, pixels from positions corresponding to FIG. 3A to an image end portion side), an uncorrected light amount, in other words an amount of light before correction, must be allocated. One type of reverse characteristic curve is the shape illustrated in FIG. 4B.

Figure 4B:
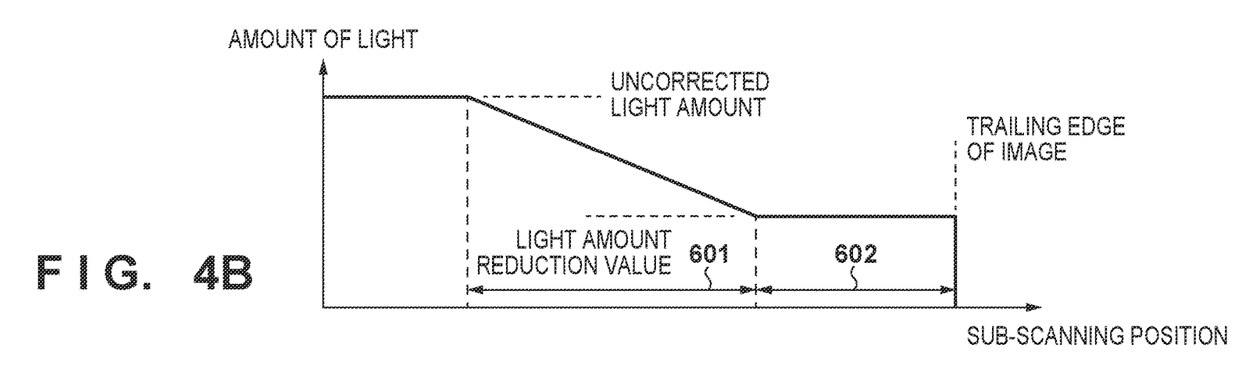

A light amount correction characteristic curve in which a light amount reduction value is allocated to a saturated flat region from the side of the trailing edge of an image, and having an inclined portion where the light amount gradually returns to the normal light amount is shown. Out of the light amount correction characteristic curve, a flat portion (trailing region) 602 corresponds to an initial sweeping correction and an inclined portion 601 corresponds to correction of the movement destination of sweeping, and these are determined so as to form a print output having level density characteristics in the trailing edge of the image.

<Control Procedure>

Figure 5:
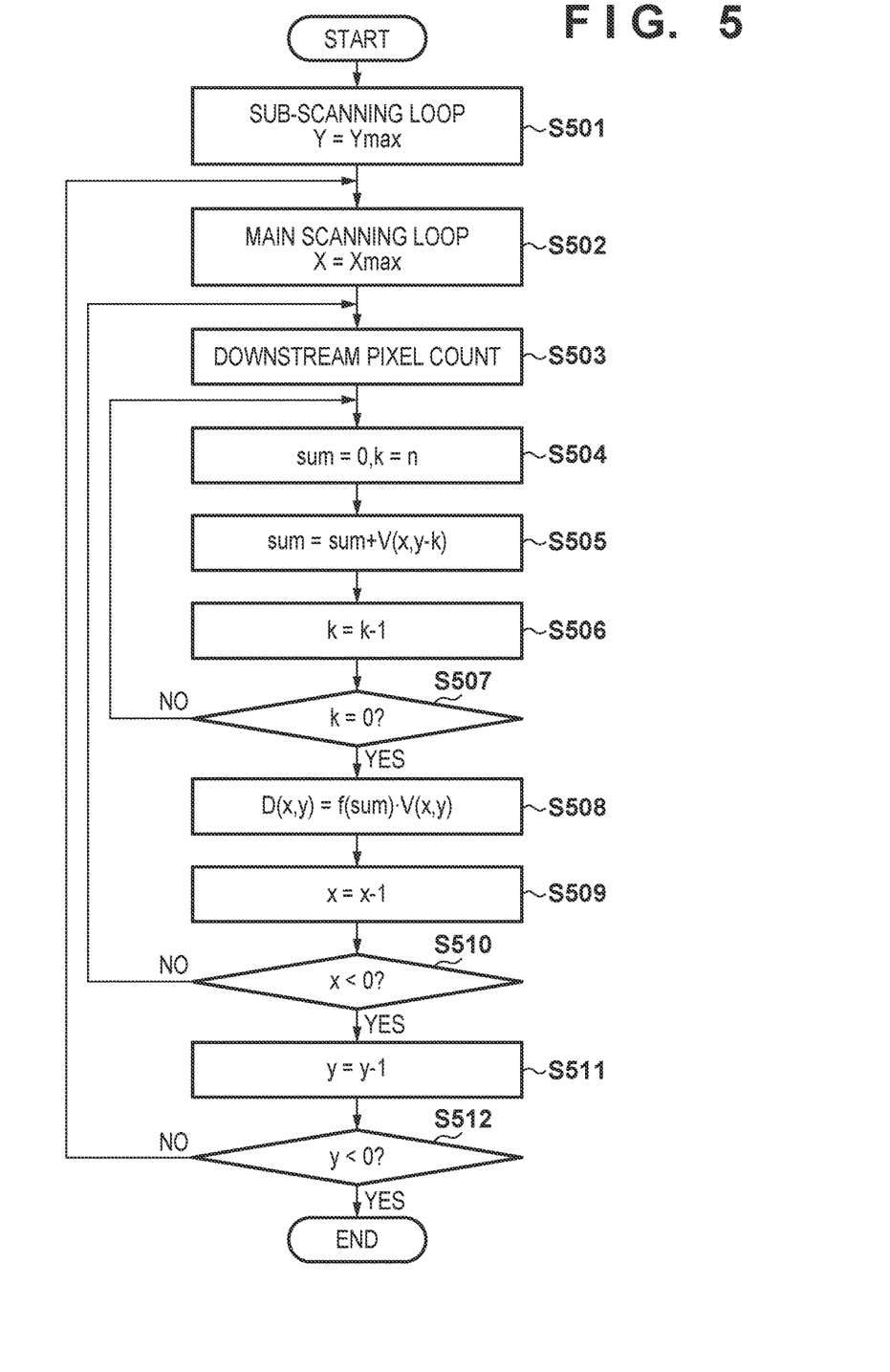
FIG. 5 is a flowchart illustrating an image processing procedure according to an embodiment.

Next, with reference to FIG. 5, description is given regarding a correction procedure for a light amount correction according to the present embodiment. Processing described below is, for example, realized by the CPU 105 reading the image generation program 111 from the ROM 101 into the program loading region 115 of the RAM 103, and executing it. Note that it is desirable for a correction characteristic curve or a lookup table to be stored in advance as some parameters of the setting information 113 or the image generation program 111. In such a case, the correction characteristic curve is referred to after moving it to the work region 116 or the like, and correction values are calculated. Because a direction for reference pixels is downstream pixels, in generation by hardware, a line buffer for fully holding main-scanning data for the width of the developing region is prepared, and reference to the downstream pixels is performed. However, in processing by software, it is possible to calculate the distance until the trailing edge of an image by counting a number of downstream pixels for the developing region width. After the generation of a print image, the print image is scanned by the procedure illustrated in FIG. 5, and a corrected image is generated. Here, V(x, y) indicates the pixel value of coordinates (x, y). D(x, y) indicates a correction light amount value for the coordinates (x, y). f(sum) indicates a correction light amount function for a time of a distance sum until the trailing edge of an image, and the shape illustrated in FIG. 4B is envisioned.

In step S501, the CPU 105 sets an image size Ymax for the sub-scanning direction that corresponds to the conveyance direction of a printing medium, based on image data to print. In addition, in step S502, the CPU 105 sets an image size Xmax for the main scanning direction. In step S503, the CPU 105 starts processing for calculating a sum total of downstream pixels for a target pixel (x, y). In a case of printing from a large sub scanning coordinate in an image, this is an operation in which pixels having a smaller y value than the y-coordinate of the target pixel are counted as downstream pixels. In step S504, the CPU 105 initializes a summation sum which is a register for calculating the sum total of downstream pixels, and sets a downstream pixel width n to a loop variable k. The loop variable k is a loop variable to repeatedly execute processing of step S504 through step S506 in order to calculate the sum total of downstream pixels.

In step S505, the CPU 105 adds the downstream pixel value V(x, y-k) for the loop variable k to the summation sum. In step S506, the CPU 105 decrements the loop variable k. In other words, k=k−1 is calculated. In step S507, the CPU 105 confirms whether to end or continue the loop. Because k=0 means the target pixel itself, it is not included in the sum total. Accordingly, when k=0, the CPU 105 determines to end the loop. At a time of not yet ending the loop, the processing returns to step S504, and at a time of ending the loop the processing proceeds to step S508. For a pixel arrangement at the trailing edge of an image, configuration may be taken to treat the summation sum of downstream pixels as the distance to the trailing edge of the image.

In step S508, the CPU 105 determines a correction light amount D(x, y) by a lookup table with the calculated summation sum as an argument, corrects the value of V(x, y), and outputs the D(x, y). The lookup table is stored in advance in the setting information 113 of the non-volatile memory 102, for example. The lookup table according to the present embodiment is defined by linking each correction light amount D(x, y) in association with each value of the calculated summation sum. The correction light amount is set with consideration given to the catch-up width of the developer roller 154 in the developing region, as described by using FIG. 6C. In more detail, the correction light amount is set to smoothly reduce so that the correction light amount is zero at a pixel separated by the catch-up width (the region width) of the developer roller 154 facing the leading edge side of an image from the trailing edge of the image. Note that the present invention is not limited to a calculation of the correction light amount D that uses a lookup table, and the correction light amount D may be obtained by substituting the summation sum into a function for calculating the correction light amount D. In such a case, information of the function may be stored in the setting information 113 in advance.

In step S509, the CPU 105 updates coordinates in the main scanning direction. In other words, x=x−1 is calculated. Next, in step S510, the CPU 105 confirms whether x<0 to confirm a loop end in the main scanning direction, and at a time when the loop is yet to end the processing returns to step S503, and at a time when the loop ends the processing proceeds to step S511.

In step S511, the CPU 105 updates coordinates in the sub-scanning direction. In other words, y=y−1 is calculated. Next, in step S512, the CPU 105 confirms whether y<0 to confirm a loop end in the sub-scanning direction, and at a time when the loop is yet to end the processing returns to step S502, and at a time when the loop ends this flowchart ends.

In this way, a sum total of a downstream pixel group for each pixel is taken, the lookup table is referred to by taking the value of the sum total as an index (search key), the light amount correction data for each pixel is obtained, and a corrected image in which replacements with the light amount correction data are made is generated. In accordance with usage of the corrected image generated by the present embodiment, it is possible to provide a print output in which sweeping at the trailing edge of an image is suppressed as in FIG. 7C.

As explained above, the image forming apparatus according to the present embodiment, for each one of predetermined pixels of image data to be formed, obtains a number of pixels to be developed on a downstream side in a sub-scanning direction from each one of the predetermined pixels. Furthermore, the present image forming apparatus, in order to correct a density increase that occurs at the trailing edge of an image to be formed in accordance with a peripheral speed difference between a photosensitive drum and a developing roller, determines a correction amount of light amount for each one of the predetermined pixels in accordance with the obtained number of pixels, and generates image formation data. The correction amount of light amount is determined to be a fixed correction amount of light amount at a trailing region of the image where a density increase occurs, and is determined so that it smoothly reduces from the foregoing fixed correction amount of light amount in a predetermined region width from a leading edge side of the trailing region toward the leading edge side of the image. In this way, by the present embodiment, there is no need to repeatedly execute correction processing because the correction amount of light amount is determined in one batch in the predetermined region width, and then smoothly reduced thereafter. Accordingly, it is possible to provide a mechanism for improving the reproducibility of a latent image by suitably correcting an influence due to sweeping without introducing an increase of processing load.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-031382 filed on Feb. 22, 2017, which is hereby incorporated by reference herein in its entirety.

What is claimed is:

1. An image forming apparatus, comprising:
a photosensitive drum;
an exposure unit configured to expose the photosensitive drum to form an electrostatic latent image on a surface of the photosensitive drum;
a developing roller configured to develop the electrostatic latent image formed on the surface of the photosensitive drum by using a developer;
a memory device that stores a set of instructions; and
at least one processor that executes the instructions to:
for each predetermined pixel of a plurality of pixels of image data to be formed, obtain a number of pixels to be developed on a downstream side in a sub-scanning direction from the predetermined pixel,
in order to correct a density increase that occurs at a trailing edge of an image to be formed in accordance with a peripheral speed difference between the photosensitive drum and the developing roller, determine a correction amount of light amount for each predetermined pixel of the plurality of pixels in accordance with the obtained number of pixels, and
generate image formation data using the correction amount of light amount determined for each predetermined pixel, and
wherein the correction amount of light amount is determined to be a fixed correction amount of light amount at a trailing region of the image where the density increase occurs, and is determined so that it smoothly reduces from the fixed correction amount of light amount in a predetermined region width from a leading edge side of the trailing region toward the leading edge side of the image.

2. The image forming apparatus according to claim 1, wherein the correction amount of light amount is determined by setting, as the predetermined region width, a region width on the developing roller that catches up to the predetermined pixel due to the peripheral speed difference while a developing region, where a developer on a surface of the developing roller is pulled to an electrostatic latent image on a surface of the photosensitive drum by the developing roller and the neighboring photosensitive drum, is passed by the predetermined pixel on the photosensitive drum.

3. The image forming apparatus according to claim 2, wherein the correction amount of light amount is determined so that a correction amount of light amount for a pixel separated by the region width toward an image leading edge side from the trailing edge of the image where the density increase occurs becomes zero.

4. The image forming apparatus according to claim 1, further comprising a storage unit configured to store a table for defining the correction amount of light amount in accordance with the number of pixels, wherein the at least one processor executes instructions in the memory device to obtain, using the obtained number of pixels, a corresponding correction amount of light amount from the table.

5. A method of controlling an image forming apparatus provided with a photosensitive drum, an exposure unit operable to expose the photosensitive drum to form an electrostatic latent image on a surface of the photosensitive drum, and a developing roller operable to develop the electrostatic latent image formed on the surface of the photosensitive drum by using a developer, the method comprising:

for each predetermined pixel of a plurality of pixels of image data to be formed, obtaining a number of pixels to be developed on a downstream side in a sub-scanning direction from the predetermined pixel;

in order to correct a density increase that occurs at a trailing edge of an image to be formed in accordance with a peripheral speed difference between the photosensitive drum and the developing roller, determining a correction amount of light amount for each predetermined pixel of the plurality of pixels in accordance with the obtained number of pixels; and generating image formation data using the correction amount of light amount determined for each predetermined pixel, wherein the correction amount of light amount is determined to be a fixed correction amount of light amount at a trailing region of the image where the density increase occurs, and is determined so that it smoothly reduces from the fixed correction amount of light amount in a predetermined region width from a leading edge side of the trailing region toward the leading edge side of the image.

6. A computer-readable storage medium storing a computer program for causing a computer to execute each step of a method of controlling an image forming apparatus provided with a photosensitive drum, an exposure unit operable to expose the photosensitive drum to form an electrostatic latent image on a surface of the photosensitive drum, and a developing roller operable to develop the electrostatic latent image formed on the surface of the photosensitive drum by using a developer, the method comprising:

for each predetermined pixel of a plurality of pixels of image data to be formed, obtaining a number of pixels to be developed on a downstream side in a sub-scanning direction from the predetermined pixel;

in order to correct a density increase that occurs at a trailing edge of an image to be formed in accordance with a peripheral speed difference between the photosensitive drum and the developing roller, determining a correction amount of light amount for each predetermined pixel of the plurality of pixels in accordance with the obtained number of pixels; and generating image formation data using the correction amount of light amount determined for each predetermined pixel, wherein the correction amount of light amount is determined to be a fixed correction amount of light amount at a trailing region of the image where the density increase occurs, and is determined so that it smoothly reduces from the fixed correction amount of light amount in a predetermined region width from a leading edge side of the trailing region toward the leading edge side of the image.

* * * * *